Figure 3:
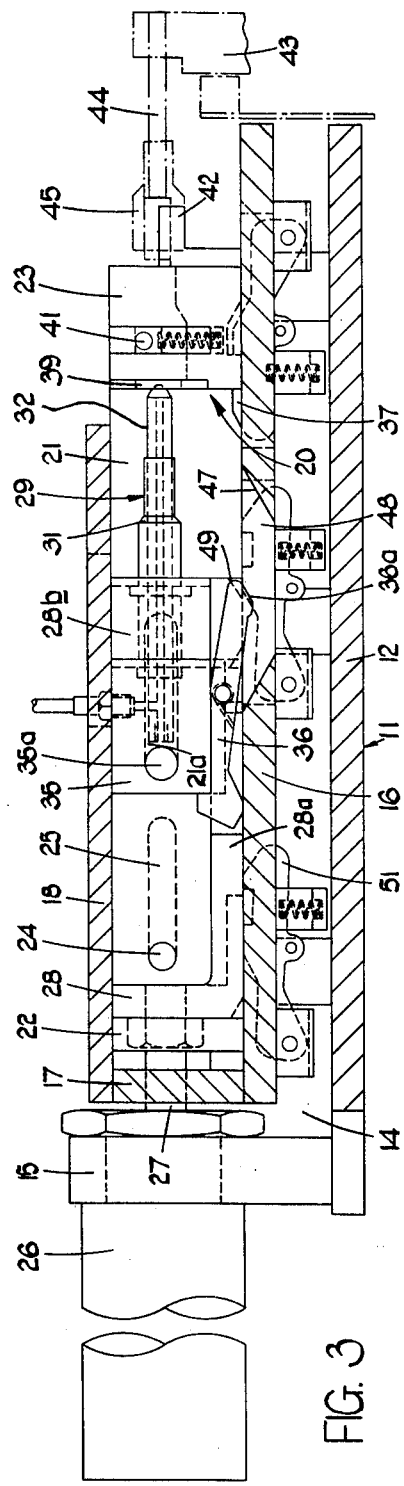

United States Patent [19]

Amphlett

[11] 4,040,178
[45] Aug. 9, 1977

[54] APPARATUS FOR ASSEMBLING A FLEXIBLE SLEEVE TO A LEAD

[75] Inventor: Robert Amphlett, Stoke-on-Trent, England

[73] Assignee: Rist's Wires & Cables Limited, Birmingham, England

[21] Appl. No.: 644,315

[22] Filed: Dec. 24, 1975

[30] Foreign Application Priority Data

Jan. 16, 1975 United Kingdom ............... 1865/75

[51] Int. Cl.² ............................................. H01B 13/22
[52] U.S. Cl. ....................................... 29/745; 29/235; 29/759
[58] Field of Search ......... 29/203 C, 203 D, 203 DT, 29/203 R, 235, 450, 631

[56] References Cited

U.S. PATENT DOCUMENTS

| | | | |
|---|---|---|---|
| 3,609,860 | 10/1971 | Hills | 29/203 D X |
| 3,667,102 | 6/1972 | Guillemette et al. | 29/203 R |
| 3,842,483 | 10/1974 | Cramer | 29/450 |

Primary Examiner—Carl E. Hall

[57] ABSTRACT

Apparatus for assembling an electrically insulating sleeve to a terminated high tension lead for use in an internal combustion engine spark ignition system, the apparatus including a frame which in use is fixed. Supported on the frame is a sleeve carrier movable between a rest position and an advanced position. First and second releasable latch devices are associated with the sleeve carrier for retaining the sleeve carrier in its rest and advanced positions, and a mandrel assembly is supported by the frame and movable linearly relative to the frame in the same direction as the sleeve carrier between a rest position and an advanced position. The first latch is releaseable at a point in the movement of the mandrel assembly wherein the mandrel has engaged in a sleeve carried by the sleeve carrier. The mechanism is such that after release of the sleeve carrier the sleeve carrier is moved with the mandrel assembly so as to engage the sleeve containing the mandrel over the end region of the high tension lead. The second latch is then released to permit the sleeve carrier to return to its rest position, and during the return movement the mandrel assembly withdraws from the sleeve so that the sleeve is left in position on the end of the high tension lead, and the apparatus is returned to its rest position.

10 Claims, 4 Drawing Figures

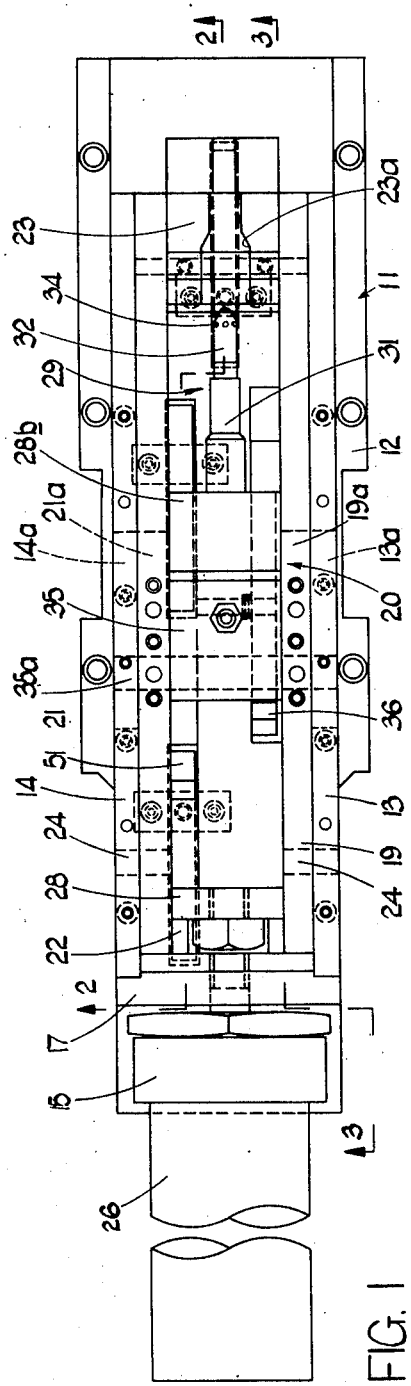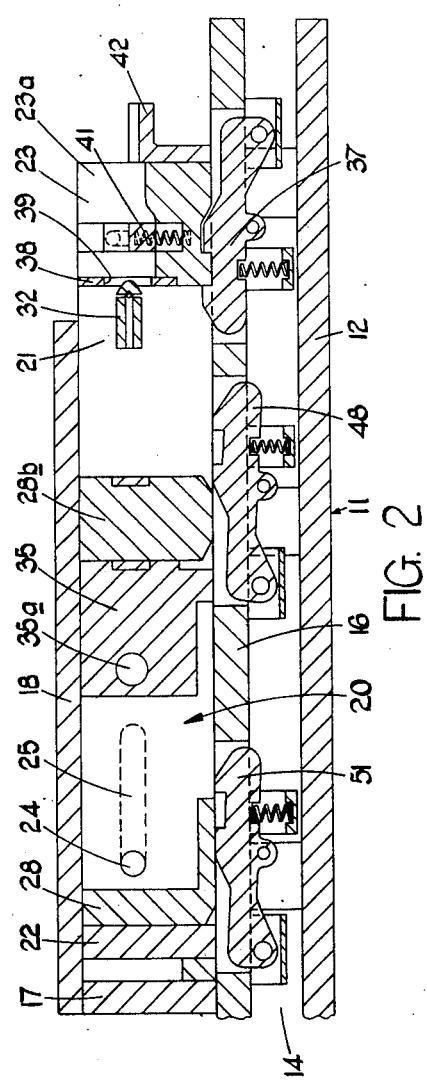

APPARATUS FOR ASSEMBLING A FLEXIBLE SLEEVE TO A LEAD

This invention relates to apparatus for assembling a flexible sleeve to a rod like component, particularly but not exclusively assembling an electrically insulating sleeve to a terminated, high tension lead for use in an internal combustion engine spark ignition system.

Apparatus according to the invention comprises a frame which, in use, is fixed, a sleeve carrier supported by the frame and movable linearly relative thereto between a rest position and an advanced position, first and second releasable latch means for retaining said sleeve carrier in said rest and advanced positions respectively, a mandrel assembly supported by said frame, and movable linearly relative to said frame in the same direction as said sleeve carrier, between a rest position and an advanced position, means for moving said mandrel assembly, first latch release means for releasing said sleeve carrier at a point in the movement of the mandrel assembly wherein the mandrel thereof has engaged in a sleeve carried by the sleeve carrier, means whereby after release of the sleeve carrier the sleeve carrier is moved with the mandrel assembly to engage the sleeve containing the mandrel over the end region of a rod like component, second latch release means for releasing said sleeve carrier for return movement from its advanced position at a point during the return movement of the mandrel assembly from its advanced position towards its rest position wherein the mandrel thereof has been withdrawn from the sleeve, and sleeve carrier return means for returning the sleeve carrier to its rest position.

Preferably said means whereby the sleeve carrier is moved with said mandrel assembly to engage the sleeve over the rod like component comprises first abutment surfaces associated with the mandrel assembly and the sleeve carrier said surfaces abutting upon or after release of said first latch means so that thereafter the sleeve carrier is moved by way of the mandrel assembly to the sleeve carrier advanced position.

Desirably said sleeve carrier return means includes second abutting surfaces associated with the sleeve carrier and the mandrel assembly, said surfaces abutting during return movement of the mandrel assembly upon or after release of said second latch means so that thereafter the sleeve carrier is returned to its rest position by way of the mandrel assembly.

Alternatively said sleeve carrier return means is a spring which is stressed by movement of the sleeve carrier to its advanced position.

Conveniently said first latch release means includes co-operable parts on the mandrel assembly and the first releasable latch means, said parts co-operating at said point in the movement of the mandrel assembly to release said first latch means.

Desirably said second latch release means includes co-operable parts on the mandrel assembly and the second releasable latch means, said parts co-operating at said point during the return movement of the mandrel assembly to release the second latch means.

Preferably said sleeve carrier includes ejection means operable after the mandrel has been withdrawn from the sleeve, but before the second latch means is operated to release the sleeve carrier, to eject the sleeve and the associated rod like component from the sleeve carrier.

Conveniently said mandrel comprises inner and outer mandrel parts movable relative to one another in the direction of movement of the mandrel assembly, and, the apparatus further includes third releasable latch means interconnecting the inner and outer mandrel parts during initial movement of the mandrel assembly from its rest position, said inner mandrel part initially projecting forwardly from the outer mandrel part, and said third latch means being released at a point in the movement of the mandrel assembly where the outer mandrel part has entered said sleeve, thereafter, during further movement of the mandrel assembly, said inner mandrel part being held against movement relative to the frame, so that the outer mandrel part and the associated parts of the mandrel assembly move with the sleeve carrier relative to the inner mandrel part.

Preferably the apparatus includes fourth releasable latch means operable to hold the inner mandrel part against movement with the outer mandrel part after release of said third latch means, said fourth latch means being released during return movement of the outer mandrel part and the associated parts of the mandrel assembly.

Conveniently said mandrel is formed with a lubricant supply passage opening at the free end of the mandrel and whereby lubricant is discharged into the sleeve to facilitate insertion of the mandrel into the sleeve as the mandrel enters the sleeve.

Figure 4:
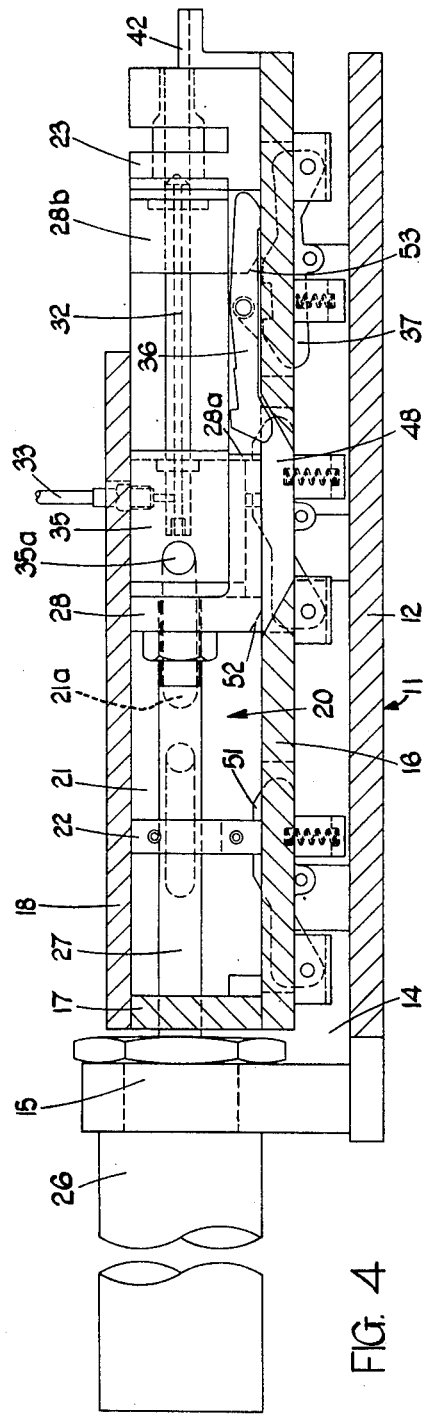

One example of the invention is illustrated in the accompanying drawings wherein, FIG. 1 is a plan view, with the top cover removed, of apparatus for engaging a flexible, resilient, electrically insulating sleeve on the terminated end region of a high tension electrical lead for use in an internal combustion engine spark ignition system, FIG. 2 is a sectional view on the line 2-2 in FIG. 1, FIG. 3 is a sectional view on the line 3-3 in FIG. 1, and FIG. 4 is a view similar to FIG. 3, but showing the parts in their advanced positions.

Referring to the drawings, the apparatus includes an elongate frame 11 which is fixed in use, and which includes a base plate 12 a pair of parallel side walls 13, 14 and an end wall 15. Fixedly secured to the base plate 12, between the side walls 13, 14 is a sub-assembly including an elongate cam plate 16 an end bush 17 and a top cover 18 which is of shorter length than the remaining components.

Mounted within the sub-assembly, and between the walls 13, 14 is a slide 20 comprising side walls 19, 21 abutting the inner faces of the side walls 13, 14 respectively, and interconnected at one end by an end piece 22 and at the other end by a sleeve carrier 23. The slide 20 is slidable longitudinally within the sub-assembly from a rest position shown in FIG. 3 to an advanced position shown in FIG. 4. Each of the side walls 19, 21 carries an outwardly extending post 24 of the posts 24 engaging in respective linear slots 25 in the side walls 13, 14 respectively, and the length of the slots 24 thus determining the limits of movement of the slide relative to the remainder of the apparatus.

The end plate 15 supports an air cylinder 26 with its longitudinal axis aligned with the length of the apparatus. The piston rod 27 of the air cylinder 26 extends through the end bush 17 and the end piece 22 and is secured to a first slide block 28 slidably received between the side walls 19, 21 of the slide 20, and riding on the cam plate 16. The slide block 28 includes a portion 28a extending forwardly, towards the sleeve carrier 23 and terminating in a head 28b carrying the forwardly extending hollow, outer part 31 of a two part stepped cylindrical mandrel 29. The mandrel 29 is aligned with the axis of the apparatus, and the second, inner part 32 of the mandrel 29 is coaxial with, and slidable within the outer part 31. The inner part 32 of the mandrel terminates at its end presented to the sleeve carrier 23 in a rounded cone, and the inner mandrel part 32 is formed with an internal passage communicating at one end with a lubricant supply conduit 33 and terminating in the rounded cone of the mandrel part 32 in six equiangularly spaced, radial outlet passages 34. The mandrel part 32 is carried by a second slide block 35 positioned between the main portion of the slide block 28 and the head 28b of the slide block 28, the mandrel part 32 passing through the head 28b and the outer, first mandrel part 31. The portion 28a of the slide block 28 is narrower in width than the block 35 and the spacing between the side walls 19, 21 of the sub-assembly, and extends along a channel formed in the lower face of the block 35. Thus the block 35 is also supported by the cam plate 16 and slidable lengthwise of the apparatus between the side walls 19, 21 of the slide. The block 35 is provided with a pair of outwardly extending posts 35a which extend through respective elongate slots 19a, 21a in the side walls 19, 21 respectively and into respective elongate slots 13a, 14a in the side walls 13, 14 respectively. The slots 19a, 21a thus limit the relative movement which can occur between the block 35, and therefore the mandrel part 32, and the slide, and the slots 13a, 14a limit the relative movement which can occur between the block 35 and the side walls 13, 14.

The slide block 28 carries a pivoted latch member 36 which is spring biased in one direction, to engage the slide block 35, and so link the slide block 35 to the slide block 28. In this operative position of the latch element 36 the slide block 35 abuts the head 28b, and the free end of the mandrel part 32 protrudes from the free end of the mandrel part 31. It will be understood therefore that when the latch 36 is operative in linking the slide block 28 to the slide block 35 then any movement of the slide block 28 will be accompanied by similar movement of the slide block 35.

A further latch element 37, pivotally mounted on the cam plate 16 is spring urged into engagement with the sleeve carrier 23, and in the retracted, rest position of the slide 20 the latch element 37 coacts with the sleeve carrier 23 to prevent sliding movement of the slide relative to the fixed frame of the apparatus. In order to free the slide for sliding movement relative to the frame, to its advanced position, it is necessary to depress the latch element 37 against the action of its operating spring.

The sleeve carrier 23 is in the form of a metal block having a longitudinally extending channel 23a therein. The channel 23a is shaped to receive the sleeve which is to be assembled to the lead, and since the sleeve is of reduced diameter at one end then the channel 23a is of similarly reduced width adjacent one end thereof. The narrower end of the channel is at the end of the block remote from the mandrel 29, and the wider end of the channel is partially closed by a stripper plate 38 secured to the carrier 23, and having therein an aperture 39 through which the widest portion of the mandrel 29 can pass, but which is too small to permit the sleeve to pass. The sleeve is, in use, loaded into the carrier 23 from the open face of the channel 23a, with the axis of the sleeve parallel to the axis of the apparatus. The wider part of the sleeve engages in the wider part of the channel, and thus the shaping of the channel prevents axial movement of the sleeve relative to the carrier 23 in one direction, the stripper plate 38 prevents axial relative movement in the opposite direction, and a clamp (not shown) being part of the apparatus for loading the sleeve into the channel 23a prevents the sleeve being lifted out of the channel. During loading of a sleeve into the channel 23a the clamp causes depression of a spring loaded ejector 41 in the base of the channel 23. As will be described, at a later stage the ejector 41 is released, and in restoring to its original position ejects the sleeve from the channel 23a.

Extending from the narrow end of the channel 23a and secured to the carrier 23 is a lead guide 42 which, during the latter stages of movement of the slide, and therefore the carrier 23 from the rest position to the advanced position, receives the terminated end of a high tension lead aligned with its axis parallel to the axis of the apparatus, and guides said lead into the channel 23a.

The operation of the apparatus is as follows:

The apparatus is positioned alongside a conveyor, with its axis at right angles to the length of the conveyor. The conveyor includes a plurality of clamps 43 (FIG. 3) and each clamp supports a high tension lead 44 extending at right angles to the conveyor. Thus each high tension lead 44 has its axis parallel to the apparatus, and each lead 44 is arranged with a portion thereof projecting from its respective clamp 43 towards the apparatus. The projecting end region of each lead 44 has previously been provided with a terminal electrically connected to the conductive core of the cable. The conveyor operates in a step-wise manner, each high tension lead 44 remaining stationary, and aligned with the apparatus for 0.5 seconds. During this period of 0.5 seconds it is desired to engage a flexible, resilient, electrically insulating sleeve 45 with the end portion of the lead 44.

The cycle of operation starts with the parts of the apparatus in the positions shown in FIGS. 1 and 3. Thus the slide carrying the carrier 23 is in its rest position, and is held thereby the latch element 37, the piston rod 27 of the cylinder 26, and therefore the block 28 is in a rest position, and the block 35 is similarly in a rest position abutting the head 28a of the block 28 and linked to the block 28 by the latch element 36. The channel 23a of the carrier 23 is empty, and the ejector 41 is in a raised position. A loading apparatus controlled in accordance with operation of the air cylinder 26 loads a rubber sleeve into the carrier 23, immediately the cylinder 26 is returned from a previous operation to its rest position. The loading of the sleeve into the carrier 23 depresses the ejector 41, and the clamp holding the sleeve down into the channel 23a maintains the ejector 41 in a depressed condition.

Arrival, adjacent the apparatus, of a lead 44 causes operation of the air cylinder 26 to advance the piston rod 27 thereof. Thus the slide blocks 28 and 35 linked by the latch element 36 are moved within the slide from their rest position towards their operative position. At this stage the slide 20 does not move since the latch 37 links the carrier 23 and the cam plate 16. The posts 35a move along the slots 13a, 14a and 19a, 21a. The free end of the inner mandrel part 32 enters the channel 23a in the carrier 23 by way of the aperture in the stripper plate 39 and the rounded conical end of the mandrel enters the wider end of the rubber sleeve 45 within the carrier 23. Immediately the end of the mandrel 29 enters the sleeve a triggering device controlled by the position of the block 35 relative to the base plate 12 is operated to cause lubricating fluid to be discharged by way of the passage in the inner mandrel and the radial passages 34 into the sleeve. The lubricant discharged into the sleeve not only lubricates the inner surface of the sleeve, but also slightly expands the sleeve to further facilitate entry of the mandrel. Continued forward movement of the blocks 35, 28 inserts the mandrel into the now lubricated sleeve to a point such that the wider outer part 31 of the mandrel is received within the sleeve, and so expands the sleeve. The purpose of the narrower, inner part 32 of the mandrel is to ensure penetration of the sleeve by the mandrel, and to supply the lubricant.

When the mandrel has entered the sleeve it will be recognised that the ejector 41 will be held against its spring bias by the mandrel and so the clamp previously holding the ejector is no longer required. The clamp is part of the separate, sleeve loading mechanism and so is released, upon entry of the mandrel into the sleeve, to permit the loading mechanism the maximum possible time in which to operate to position a further sleeve for insertion into the sleeve carrier in the next cycle of operation. Movement of the blocks 28, 35 sufficiently far to engage the part 31 of the mandrel within the sleeve results in movement of the latch element 36 relative to the cam plate 16 to a point at which the forward end 36a of the element 36 engages an inclined ramp 47 on the cam plate 16. Further movement of the blocks 28, 35 relative to the cam plate 16 causes the latch element 36 to be pivoted against its spring bias, by co-operation of the end 36a of the element and the ramp 47 to release the latch element 36 so freeing the block 35 from the block 28. Fractionally thereafter the block 35 is arrested by engagement of the post 35a with the ends of the slots 13a, 14a and a further latch element 48 pivotally mounted on the cam plate 16 engages the block 35 to prevent further movement thereof. Thus since the block 35 and therefore the inner mandrel part 32 are arrested and the piston rod 27 is still being advanced then the block 28 and the outer mandrel part 31 continue to move relative to the block 35 and the inner mandrel part 32, the outer mandrel part 31 being inserted further into the sleeve 45 carried by the carrier 23. A short distance in the movement of the head 28 after the latch element 48 has operated to hold the block 35, a ramp surface 49 on the forward end of the head 28b of the block 28 engages the latch element 37 and further movement of the block 28 results in depression of latch element 37 against its biasing spring to release the carrier 23 and the remainder of the slide 20 for movement relative to the sub-assembly of the apparatus. Almost immediately this point in the sequence is reached the head 28b abuts the carrier 23, and so continued movement of the block 28 relative to the block 35 and cam plate 16 takes with it the slide, and the carrier 23 the side walls 19, 21 moving relative to the block 35 so that the previous movement of the posts 35a along the slots 19a, 21a is so to speak reversed. Thus during remaining movement of the block 28 to its advanced position the carrier 23 and the slide 20 are moved from their rest position to their advanced position, and so the sleeve and the outer mandrel part 31 move as one relative to the inner mandrel part 32. Upon reaching the advanced position the inner mandrel part 32 has been left some way behind, and so the free end of the outer mandrel part 31 is open. The movement of the block 28 from its rest, to its advanced position causes the lead guide 42 to engage the lead 44, and guide the lead 44 into the channel 23a of the carrier 23. Thus the movement of the carrier 23 relative to the lead 44 inserts the terminated end of the lead 44 into the open end of the outer mandrel part 31 so that the terminated end of the lead is received within the expanded sleeve 45 on the mandrel part 31. Forward movement of the slide to its advanced position is limited by engagement of the posts 24 with the ends of the slots 25 in the side walls 13, 14 of the apparatus. As the slide 20, and carrier 23 reach their fully advanced position a further latch element 51 engages the end piece 22 of the slide 20 to retain the slide 20 and therefore the carrier 23 and the sleeve in the advanced position.

The advanced position of the slide corresponds to the maximum stroke of air cylinder 26, and at this point the operation of the air cylinder 26 is reversed to retract the piston rod 27 thereof. Thus the block 28 is moved back towards its rest position, from its fully advanced position but the slide and the carrier 23 are held in their advanced position by the latch element 51. Similarly, the block 35 and inner mandrel part 32 cannot move since they are held by the latch element 48. Thus the mandrel part 31 is withdrawn from the sleeve 45 within the carrier 23, the stripper plate 39 ensuring that the sleeve 45 is stripped from the mandrel part 31. Thus there is little or no axial movement between the sleeve 45 and the lead end 44 and as the mandrel part 31 is withdrawn from the sleeve 45 the sleeve 45 which was expanded by the mandrel part 31 restores towards its original configuration so gripping the lead 44. Moreover, withdrawal of the mandrel part 31 releases the ejector 41 so that the ejector 41 ejects the sleeve and lead from the sleeve carrier.

The block 28 and therefore the head 28b and the outer mandrel part 31 move back towards their rest position relative to the remaining components of the apparatus. During this movement, and substantially simultaneously, a ramp 52 on the block 28 engages the latch element 51 and a ramp 53 on the head 28b engages the latch element 48. Continued movement of the head 28 thus depresses latch elements 48 and 51 against their biasing springs to release the block 35 and the end piece 22 from the cam plate 16 respectively. Shortly thereafter the head 28b abuts the block 35 to move the block 35 therewith back towards the rest position. At the point at which the head 28b abuts the block 35 in the return direction the spring biased latch element 36 once again engages the block 35 to link the blocks 35 and 28 in readiness for a subsequent operating stroke. The blocks 28 and 35 then continue back towards their rest position relative to the slide and the carrier 23 for a short distance until the block 28 abuts the end piece 22 of the slide, and thereafter the block 35, 28 and the slide 20 and therefore the carrier 23 move back as one to the rest position wherein the end piece 23 abuts the end bush 17 and operation of the air cylinder 26 ceases. Thereafter, the conveyor mechanism carrying the lead can continue to its next subsequent step in the step-wise operation of the conveyor. As the parts of the apparatus reach their original, rest position the latch element 37 once again engages the carrier 23 to lock the carrier 23 and therefore the remainder of the slide in their rest position. Thus the apparatus is returned to its rest position in readiness for a further cycle of operation. The complete operating sequence from rest position back to rest position is accomplished in no more than 0.5 seconds, the length of time during which the conveyor retains a lead 44 adjacent the apparatus.

The mechanism for supplying the rubber sleeves to the carrier 23 can take a number of forms, but for convenience involves a pair of vibratory feeders which supply sleeves orientated vertically with their largest diameter ends lowermost to a discharge station which loads the sleeves singly onto a transfer wheel. The transfer wheel is mounted for rotation about an axis disposed at 45° to the horizontal, and includes a plurality of sleeve clamps extending at 45° to the plane of rotation of the wheel. The clamps are equiangularly disposed around the periphery of the wheel and the wheel is operated in a step-wise manner similar to the step-wise operation of the conveyor with which the above described apparatus is associated. Sleeves from the discharge point are pushed into the clamps on the transfer wheel, at the uppermost point on the transfer wheel and so as each sleeve engages a clamp on the transfer wheel it is still vertically disposed with its widest and lowermost. The lowermost point of the transfer wheel is positioned adjacent the rest position of the carrier 23, and by virtue of the 45° inclination of the rotational axis of the wheel, and the 45° positioning of the clamps relative to the plane of rotation of the wheel then when sleeves reach the lowermost point of the wheel they are disposed horizontally rather than vertically, and with their widest ends aligned with the widest end of the channel 23a in the carrier 23. The clamp which holds the sleeves in the channel 23 is operated to displace each sleeve from its respective clamp on the transfer wheel as each sleeve reaches the lowermost point of the transfer wheel, and upon being displaced from the transfer wheel the sleeve engages in the channel 23a in readiness for assembly to a lead 44.

In the apparatus described above the movements of the mandrel assembly and the slide in both directions are achieved by the air cylinder 26, the slide being moved by way of the mandrel assembly. It will be recognised however that the cylinder 26 could be used to drive the parts in one direction only, the movement in the opposite direction being achieved by a spring. Moreover while the mandrel assembly could be driven by the cylinder 26 in both directions the slide could be moved by the mandrel assembly in one direction, conveniently the advance direction and could be moved in the other direction by a spring.

While the apparatus is described above in relation to assembling a flexible sleeve onto one end of a high tension lead, it is to be understood that the apparatus can be utilized to assemble flexible sleeves to other rod-like components.

I claim:

1. Apparatus for assembling a flexible sleeve to a rod-like component comprising a frame which, in use, is fixed, a sleeve carrier supported by the frame and movable linearly relative thereto between a rest position and an advanced position, first and second releasable latch means for restraining said sleeve carrier in said rest position and advanced positions respectively, a mandrel supported by said frame, and movable linearly relative to said frame in the same direction as said sleeve carrier, between a rest position and an advanced position, means for moving said mandrel, first latch release mean for releasing said sleeve carrier at a point in the movement of the mandrel wherein the mandrel has engaged in a sleeve carried by the sleeve carrier, means whereby after release of the sleeve carrier the sleeve carrier is moved with the mandrel to engage the sleeve, containing the mandrel, over the end region of a rod like component, second latch release means for releasing said sleeve carrier for return movement from its advanced position at a point during the return movement of the mandrel from its advanced position towards its rest position wherein the mandrel has been withdrawn from the sleeve, and sleeve carrier return means for returning the sleeve carrier to its rest position.

2. Apparatus as claimed in claim 1, wherein said means whereby the sleeve carrier is moved with said mandrel to engage the sleeve over the rod like component has a first abutment surface engaging said sleeve carrier, which upon release of said first latch means moves the sleeve carrier by way of the mandrel, to the sleeve carrier advanced position.

3. Apparatus as claimed in claim 1, wherein said sleeve carrier return means includes a second abutment surface engaging said sleeve carrier which upon release of said second latch means moves said sleeve carrier to its rest position by way of the mandrel.

4. Apparatus as claimed in claim 1, wherein said sleeve carrier return means is a spring which is stressed by movement of the sleeve carrier to its advanced position.

5. Apparatus as claimed in claim 1, wherein said first latch release means includes means operable at the point in the forward movement of the mandrel for releasing said first latch means.

6. Apparatus as claimed in claim 1, wherein said second latch release means includes means operable at the point during the return movement of the mandrel for releasing the second latch means.

7. Apparatus as claimed in claim 1, wherein said sleeve carrier includes ejection means operable after the mandrel has been withdrawn from the sleeve, but before the second latch means is operated to release the sleeve carrier, to eject the sleeve and the associated rod like component from the sleeve carrier.

8. Apparatus as claim in claim 1, wherein said mandrel comprises inner and outer mandrel parts, constituting a mandrel assembly, movable relative to one another in the direction of movement of the mandrel assembly, and, the apparatus further includes third releasable latch means interconnecting the inner and outer mandrel parts during initial movement of the mandrel assembly from its reset position, said inner mandrel part initially projecting forwardly from the outer mandrel part, and said third latch means being released at a point in the movement of the mandrel assembly where the outer mandrel part has entered said sleeve, thereafter, during further movement of the mandrel part being held against movement relative to the frame, so that the outer mandrel part and the associated parts of the mandrel assembly move with the sleeve carrier relative to the inner mandrel part.

9. Apparatus as claimed claim 8, wherein there is provided fourth releasable latch means operable to hold the inner mandrel part against movement with the outer mandrel part after release of said third latch means, said fourth latch means being released during return movement of the outer part and the associated parts of the mandrel assembly.

10. Apparatus as claimed claim 1, wherein said mandrel is formed with a lubricant supply passage opening at the free end of the mandrel and whereby lubricant is discharged into the sleeve to facilitate insertion of the mandrel into the sleeve as the mandrel enters the sleeve.

* * * * *